Nov. 14, 1933.  J. K. SCOTT  1,935,063
METHOD OF MAKING PIPE JOINTS
Filed June 11, 1931

James K. Scott
INVENTOR
BY O. V. Thiele
ATTORNEY

Patented Nov. 14, 1933

1,935,063

UNITED STATES PATENT OFFICE 1,935,063

METHOD OF MAKING PIPE JOINTS

James K. Scott, East Orange, N. J., assignor to The Superheater Company, New York, N. Y.

Application June 11, 1931. Serial No. 543,527

2 Claims. (Cl. 29—148.2)

This invention relates to the art of joining pipes end to end and has for its purpose the provision of an improved joint of this sort and a method of making it.

The invention pertains more particularly to pipe joints made by so-called autogenous welding. In the ordinary manner of welding two pipes together by this process, the pipes are first scarved or bevelled off so that when placed end to end they present a circumferential V-shaped groove. The welding material that is added fills this groove when the joint is finished and usually some excess welding material is added and extends beyond the contour of the two pipes. In practice it is difficult to prevent some of the material from flowing through the crack between the pipes into the interior. This is frequently highly objectionable and means have been suggested heretofore for obviating it.

My own invention supplies a ready means of making such a joint, at the same time effectually preventing the difficulty mentioned.

Figure 1:
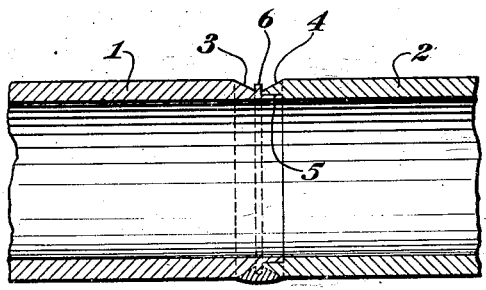
Figure 2:
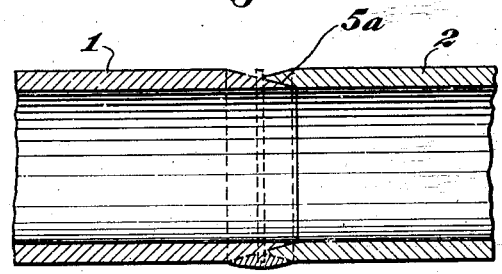

The invention is illustrated in the drawing filed herewith in which Fig. 1 shows a longitudinal section of two pipes, the upper portion showing the pipes prepared for the welding and the lower part showing the weld complete; Fig. 2 showing a section similar to Fig. 1 of a variation.

Referring first to Fig. 1, the two pipes 1 and 2 are prepared at their ends by bevelling the outer surface as at 3 and 4. The pipe 1 is provided with a tongue 5 projecting into a corresponding circumferential inner groove in pipe 2. Pipe 1 is further provided with a circumferential rib 6 which lies at the bottom of the V formed by the two bevelled surfaces and abuts against the end of the bevelled portion of pipe 2.

It will be seen that the preparation of the pipes for welding is a relatively simple matter and one that can be accomplished even in the field with simple tools. The bead or rib 6 is shown sharply rectangular in the figure although in practice it might be rounded or outwardly tapered.

When the two pipes have been prepared as stated and assembled in position, the torch is applied in the usual manner and the necessary material added. In this process the rib 6 and the tapered end of pipe 2 which are of approximately the same thickness will be the first parts to fuse and weld together. If the work is properly done, the tongue 5 will not become fused, and it will prevent the melted matter from flowing in between the two pipes. As the work progresses, the tapered portion of pipe 1 will likewise melt and fuse with the added material and the completed joint will in section look as is indicated in the lower part of Fig. 1.

In the variation in Fig. 2, the tongue 5a of pipe 1 is bevelled and a recess in pipe 2 is given a corresponding shape. This form is somewhat easier to prepare but in all essential features is like that of Fig. 1. The completed joint is indicated in the lower part of Fig. 2.

It will be clear that some modifications may be made in the invention without departing from its spirit.

What I claim is:
1. The process of joining two pipes end to end which comprises forming one end so it has a circumferential rib and thinned cylindrical end portion and the other with a thinned annular portion adapted to fit over the cylindrical portion of the first and to abut against the rib, assembling the two and autogenously welding them together by first fusing the rib of the one and the abutting annular portion of the other and then adding further fused material.

2. The process of joining two pipes end to end which comprises forming one end so it has a circumferential rib and a thinned annular end portion and the other with a thinned annular portion adapted to fit over the annular portion of the first and to abut against the rib, assembling the two and autogenously welding them together by first fusing the rib of the one and the abutting annular portion of the other and then adding further fused material.

JAMES K. SCOTT.